(12) United States Patent
Wong et al.

(10) Patent No.: US 9,065,535 B2
(45) Date of Patent: Jun. 23, 2015

(54) ADAPTIVE ANTENNA SELECTION

(71) Applicant: Intel Corporation, Santa Clara, CA (US)

(72) Inventors: Hong Wong, Portland, OR (US); Wah Yiu Kwong, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 186 days.

(21) Appl. No.: 13/679,082

(22) Filed: Nov. 16, 2012

(65) Prior Publication Data

US 2014/0141733 A1    May 22, 2014

(51) Int. Cl.
*H04M 1/00*    (2006.01)
*H04B 1/3827*    (2015.01)

(52) U.S. Cl.
CPC .................... *H04B 1/3827* (2013.01)

(58) Field of Classification Search
CPC .................................................. H01Q 1/243
USPC .......... 455/575.7, 140, 277.1, 106, 132, 133, 455/134, 135, 575.1, 277.2; 343/702, 724, 343/853
See application file for complete search history.

(56) References Cited

U.S. PATENT DOCUMENTS

| | | | | |
|---|---|---|---|---|
| 7,627,296 | B2 * | 12/2009 | Kezys et al. | 455/140 |
| 7,787,922 | B2 * | 8/2010 | Yamazaki et al. | 455/575.7 |
| 8,463,222 | B2 * | 6/2013 | Su et al. | 455/289 |
| 8,532,587 | B2 * | 9/2013 | Lagnado et al. | 455/101 |
| 2002/0094789 | A1 * | 7/2002 | Harano | 455/90 |
| 2006/0276221 | A1 | 12/2006 | Lagnado et al. | |
| 2007/0037619 | A1 | 2/2007 | Matsunaga et al. | |
| 2012/0071203 | A1 | 3/2012 | Wong | |
| 2012/0162040 | A1 * | 6/2012 | Taura et al. | 343/770 |
| 2012/0190398 | A1 | 7/2012 | Leukkunen et al. | |

OTHER PUBLICATIONS

International Search Report from related PCT/US2013/043344 mailed Sep. 13, 2013.

* cited by examiner

*Primary Examiner* — Sonny Trinh (74) *Attorney, Agent, or Firm* — Grossman, Tucker, Perreault & Pfleger, PLLC (57) ABSTRACT

The present disclosure is directed to adaptive antenna selection. In general, devices consistent with the present disclosure may be configured to adapt their antenna configuration to sensed device conditions. In one embodiment, an example device may comprise a communication module, a plurality of antennas, at least one sensor and an antenna selection module. The communication module may be configured to send and receive information via at least wireless communication. The plurality of antennas may be configured to conduct the wireless communication, while the sensors may be configured to sense device conditions. The antenna selection module may be configured to cause at least one antenna in the plurality of antennas to be coupled to the communication module based on the device conditions.

17 Claims, 6 Drawing Sheets

ADAPTIVE ANTENNA SELECTION

TECHNICAL FIELD

The present disclosure relates to wireless communication devices, and more particularly, to devices that are enabled to alter a communications configuration based on sensed conditions.

BACKGROUND

The ability to communicate wirelessly is becoming a necessity in emerging applications. Not only are new communication devices being introduced, but older devices that may have not featured wireless functionality are also being rethought. Wireless-enabled equipment commonly comprises at least radio circuitry and some sort of antenna over which wireless communication may be conducted. Both of these components are important to providing high quality of service. The radio circuitry may dictate the communication ability of the device, the types of interaction that may be conducted, etc., however, without a well-designed antenna signals may be dropped or not received at all. Thus, thought must be given to how these components are implemented.

When considering antenna implementation for mobile devices, there are many factors that may be influential. For example, at least one version of the popular iPhone mobile device manufactured by Apple Inc. would allegedly drop connections based on the manner in which a user held the device. It was later confirmed that the design of the antenna caused the iPhone to drop calls when the hand of the user was placed in contact with antenna bands that surrounded the device. In addition to placement, interference with the human body is also a concern. For example, the Federal Communication Commission (FCC) has enacted specific absorption rate (SAR) limits to ensure that wireless-enabled device users are not exposed to excess amounts of radio frequency (RF) energy. Again, since RF energy transmission and reception is focused at the antenna of the device, careful consideration must be given to antenna placement and design. The need to account for various usage scenarios, user safeguards, device performance, etc., may substantially dictate the implementation of antennas in wireless devices, which as a consequence may also limit device functionality, may increase the device size, may increase device cost, etc.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

This disclosure describes systems and methods pertaining to adaptive antenna selection. While computing devices having a laptop or notebook configuration are utilized for the sake of explanation herein, this is merely because these types of devices allow for a fuller description of the various embodiments. The various embodiments disclosed herein are not limited to use with only these types of devices, and may be applied equally as well to other devices with the ability to communicate wirelessly. For example, the various embodiments may be applied equally as well to mobile communication devices (e.g., cellular handsets, smart phones, etc.), tablet-type computing devices, or other devices having an antenna configured for wireless communication.

In general, devices consistent with the present disclosure may be configured to adapt their antenna configuration to sensed device conditions. In one embodiment, an example device may comprise a communication module, a plurality of antennas, at least one sensor and an antenna selection module. The communication module may be configured to send and receive information via at least wireless communication. The plurality of antennas may be configured to conduct the wireless communication, while the sensors may be configured to sense device conditions. The antenna selection module may be configured to cause at least one antenna in the plurality of antennas to be coupled to the communication module based on the device conditions.

The antenna selection module may comprise, for example, at least a multiplexer coupled to the communication module and the plurality of antennas. The multiplexer may be configured to select the at least one of the plurality of antennas to be coupled to the communication module. The antenna selection module may also comprise a controller coupled to the at least one sensor and the multiplexer, the controller being configured to control the selection of the multiplexer based on the device condition. The device conditions may include various conditions related to the device based on the abilities of the at least one sensor. For example, the at least one sensor may sense a mechanical configuration for the device, the mechanical configuration including at least an orientation of a first portion of the device relative to a second portion of the device. In such instances, the device may have a base portion and a display portion coupled by a movable connection configurable in at least one of an open orientation, a closed orientation or a tablet orientation, and the antenna selection module may select that at least one antenna based on the device being sensed in the open, closed or tablet orientation. Alone or in combination with the above, the same or a different sensor may be configured to sense at least one of orientation or position change in the device. For example, if the device were a tablet-type computing device, or configurable as a tablet-type computing device as seen with some notebook-type devices, the antenna selection module may be configured to select the at least one antenna based on whether the device is sensed to be operating in a portrait or landscape orientation. In addition, the same or a different sensor may be configured to sense the proximity of the plurality of antennas to the human body. For example, the antenna control module may be configured to select the at least one antenna based on the at least one antenna being sensed as not proximate to the human body.

Figure 1:
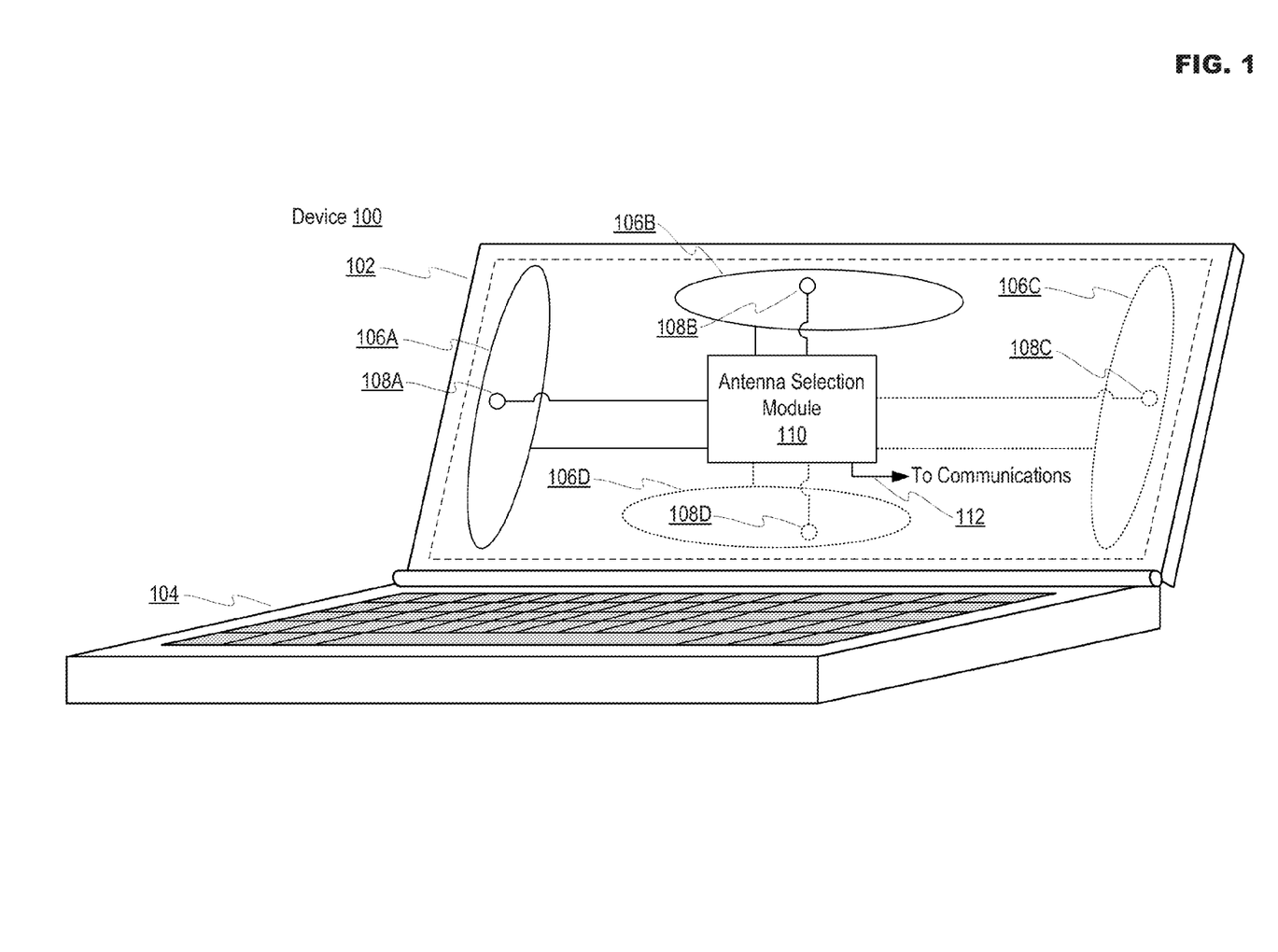
FIG. 1 illustrates an example of a device configured with adaptive antenna selection in accordance with at least one embodiment of the present disclosure.

FIG. 1 illustrates an example of device 100 configured with adaptive antenna selection in accordance with at least one embodiment of the present disclosure. Device 100 may be enabled for wireless communication in that it may transmit and receive information wirelessly. Device 100 may be, for example, a desktop computer, laptop computer, notebook computer, tablet computer, palmtop computer, mobile communication device (e.g., cellular handset or smart phone), etc. For use in explanation herein, device 100 is clamshell-type device comprising display portion 102 coupled to base portion 104 by a movable connection (e.g., a hinge). In FIG. 1, Device 100 has been illustrated in an open orientation. Other example orientations for device 100, such as a closed orientation and a tablet orientation, will be discussed in regard to FIG. 4.

Device 100 may further comprise antennas 106A-D and sensors 108A-D. While these components are illustrated in various locations in display portion 102, the locations are merely for the sake of example. Antennas 106A-D and/or sensors 108A-D may be located anywhere in device 100 wherein antenna reception may be maximized based on, for example, the design of device 100, the intended use of device 100, etc. Existing devices usually employ only a single antenna setup (e.g., comprising a single antenna or a primary antenna and backup). In some instances more than one antenna may be employed in a device, however, these antennas typically function together such as in a diversity scheme to improve wireless signal reception. Regardless, the antennas in existing devices typically only reside in a single location within the device (e.g., one of the locations corresponding to antennas 106A-D in FIG. 1). Consistent with the present disclosure, device 100 may have antennas in at least two locations (e.g., antennas 106A and B). Antennas 106C and D are optional, and illustrate other example locations for antenna placement. Sensors 108A-D may be placed in various locations in device 100 depending on, for example, the type of device condition being sensed (e.g., antenna-related proximity sensing may require that each sensor 108A-D be placed near each antenna 106A-D, while mechanical configuration sensors, orientation sensors, position change sensors, etc. may reside other places in device 100).

In one embodiment, antenna selection module 110 may be coupled to antennas 106A-D, sensors 108A-D and to communication resources in device 100 as shown 112. The placement of antenna selection module 110 is not limited to within display portion 102, and may be relocated anywhere within device 100 based on design advantages, requirements, etc. Antenna selection module 110 may be configured to receive device condition information from at least one of sensors 108A-D and to couple at least one of antennas 106A-D to the communication resources in device 100 as shown at 112. The presence of a plurality of selectable antennas in device 100 may allow antennas that are determined to deliver the best performance (e.g., based on predicted sources of interference), antennas that are determined to avoid problematic situations (e.g., SAR exposure), etc. to be used for communication in device 100. The determination of at least one antenna 108A-D to select may be performed by antenna selection module 110 based on device condition information received from various sensors 108A-D in device 100.

Figure 2:
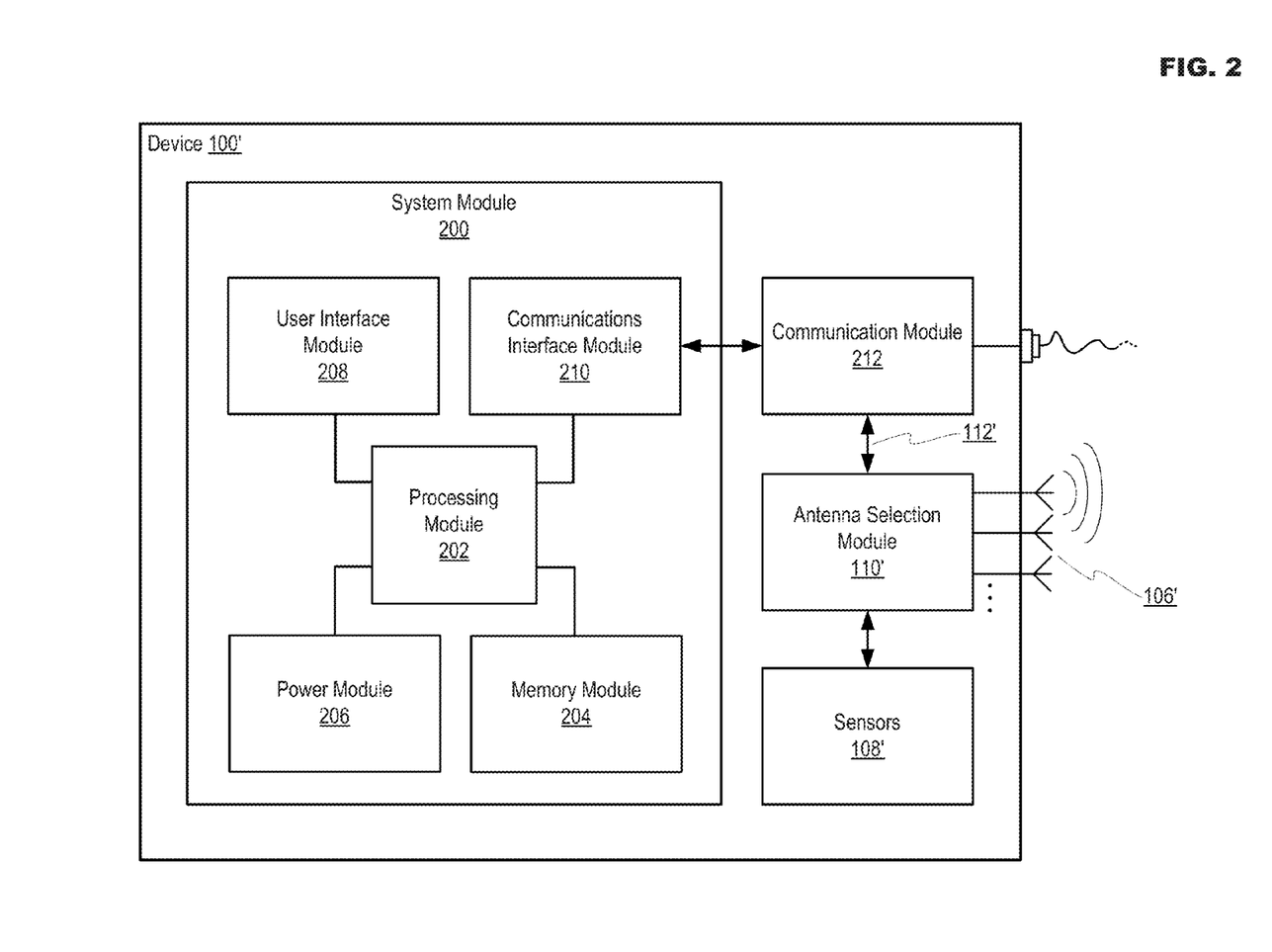
FIG. 2 illustrates an example configuration for a device including adaptive antenna selection in accordance with at least one embodiment of the present disclosure.

FIG. 2 illustrates an example configuration for device 100' including adaptive antenna selection in accordance with at least one embodiment of the present disclosure. Device 100' may comprise system module 200 configured to generally manage device operations. System module 202 may include, for example, processing module 202, memory module 204, power module 206, user interface module 208 and communication interface module 210 that may be configured to interact with communication module 212. Device 100' may also include a plurality of antennas 106A-D (e.g., collectively 106'), sensors 108A-D (e.g., collectively 108') and antenna selection module 110'. While communication module 212 and antenna selection 110' have been shown separate from system module 200, this is merely for the sake of explanation herein. Some or all of the functionality associated with communication module 212 and/or antenna selection module 110' may also be incorporated into system module 200.

In device 100', processing module 202 may comprise one or more processors situated in separate components, or alternatively, may comprise one or more processing cores embodied in a single component (e.g., in a System-on-a-Chip (SOC) configuration) and any processor-related support circuitry (e.g., bridging interfaces, etc.). Example processors may include various x86-based microprocessors available from the Intel Corporation including those in the Pentium, Xeon, Itanium, Celeron, Atom, Core i-series product families. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in device 100'. Some or all of the functionality commonly associated with the support circuitry may also be included in the same physical package as the processor (e.g., an SOC package like the Sandy Bridge integrated circuit available from the Intel Corporation).

Processing module 202 may be configured to execute various instructions in device 100'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) or read-only memory (ROM) in a fixed or removable format. RAM may include memory configured to hold information during the operation of device 100' such as, for example, static RAM (SRAM) or Dynamic RAM (DRAM). ROM may include memories such as bios memory configured to provide instructions when device 100' activates, programmable memories such as electronic programmable ROMs (EPROMS), Flash, etc. Other fixed and/or removable memory may include magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), etc. Power module 206 may include internal power sources (e.g., a battery) and/or external power sources (e.g., electromechanical or solar generator, power grid, etc.), and related circuitry configured to supply device 100' with the power needed to operate.

User interface module 208 may include circuitry configured to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, etc.) and output mechanisms (e.g., speakers, displays, lighted/flashing indicators, electromechanical components for vibration, motion, etc.). Communication interface module 210 may be configured to handle packet routing and other control functions for communication module 212, which may include resources configured to support wired and/or wireless communications. Wired communications may include serial and parallel wired mediums such as, for example, Ethernet, Universal Serial Bus (USB), Firewire, Digital Visual Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), optical character recognition (OCR), magnetic character sensing, etc.), short-range wireless mediums (e.g., Bluetooth, WLAN, Wi-Fi, etc.) and long range wireless mediums (e.g., cellular, satellite, etc.). In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission.

In one embodiment, antenna selection module 110' may interact with at least antennas 106', sensors 108' and communication module 212 (e.g., shown at 112'). For example, antenna selection module 110' may be configured to receive device condition information from sensors 108' and to cause at least one of antennas 106' to be coupled to communication module 212 based on the received device condition information. Communication module 212 may then be configured to utilize the at least one antenna that is coupled to communications module 212 by antenna selection module 110' to transmit and receive information via wireless communication.

Figure 3:
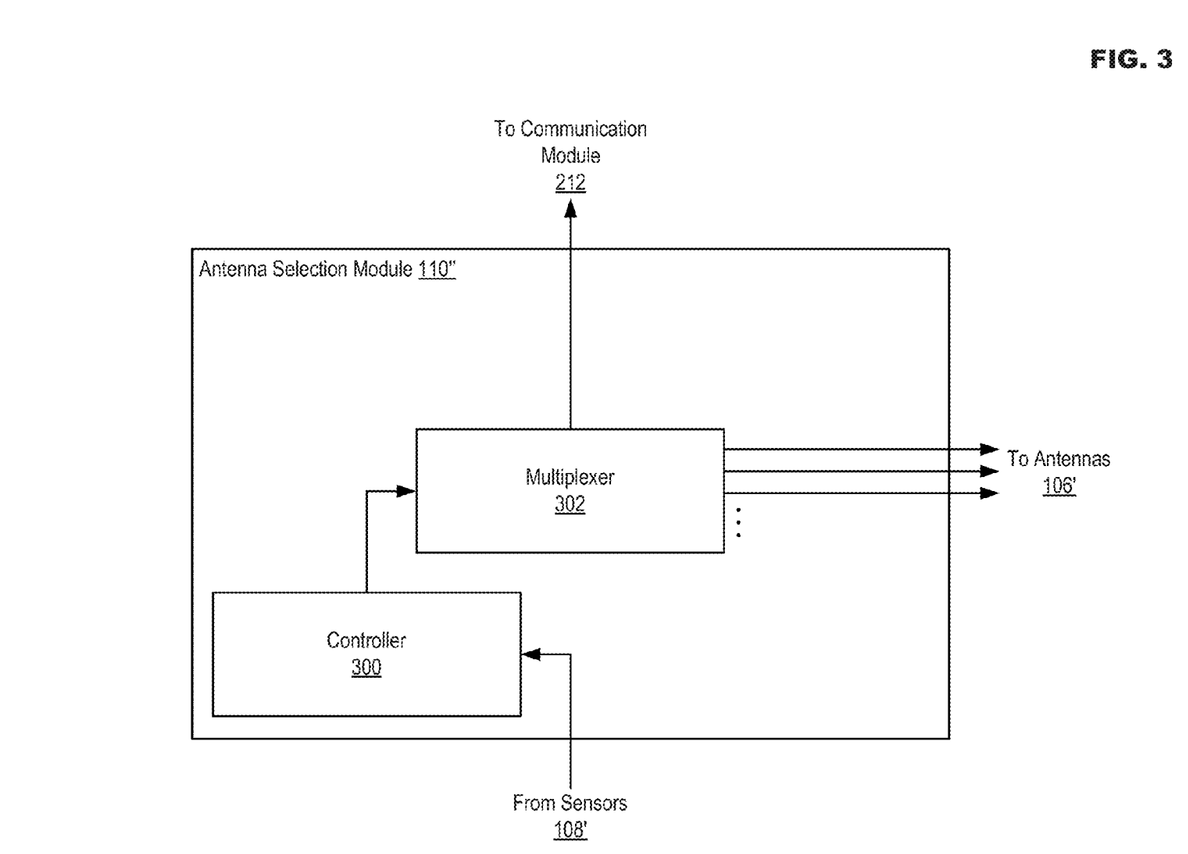
FIG. 3 illustrates an example configuration for an antenna selection module in accordance with at least one embodiment of the present disclosure.

FIG. 3 illustrates an example configuration for antenna selection module 110" in accordance with at least one embodiment of the present disclosure. Antenna selection module 110" may comprise, for example, controller 300 and multiplexer 302. In one embodiment, controller 300 may be a microcontroller and multiplexer 302 may be a radio frequency (RF) multiplexer. Multiplexer 302 may be situated between communication module 212 and antennas 106' and may be configured to select at least one antenna from antennas 106'. In selecting an antenna, multiplexer 302 may couple the selected antenna to communication module 212, which may then use the selected antenna for wireless communication. Controller 300 may be situated between sensors 108' and multiplexer 302, and may be configured to control the selection of multiplexer 302 based on device condition information received from sensors 108'. Examples of device condition information that may be received by controller 300, and the manner in which the device condition information may be used by controller 300, will be disclosed in FIG. 4-5.

Figure 4:
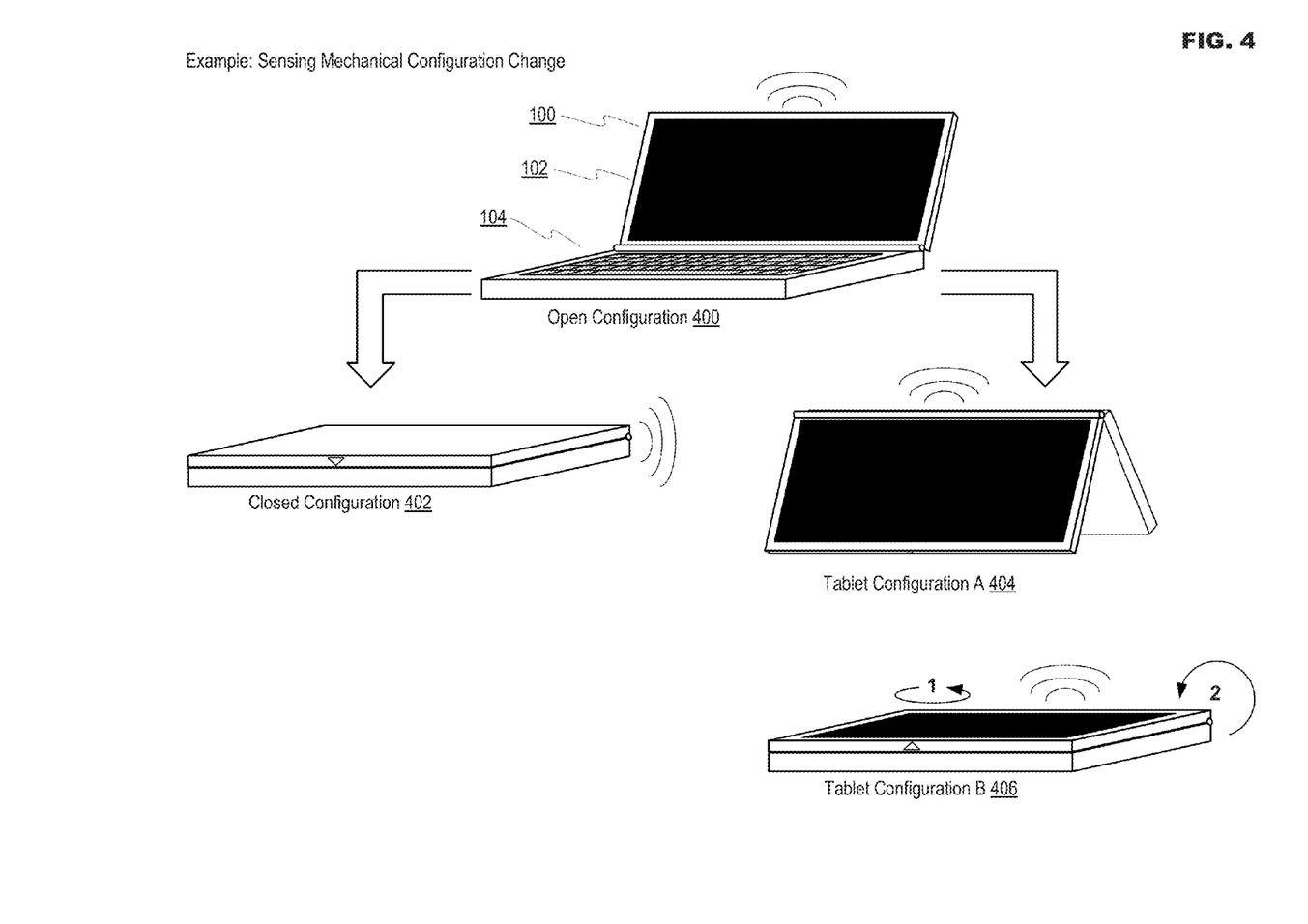
FIG. 4 illustrates examples of sensing device mechanical configuration in accordance with at least one embodiment of the present disclosure.

FIG. 4 illustrates examples of sensing device mechanical configuration in accordance with at least one embodiment of the present disclosure. In one embodiment, device 100 may be equipped with at least one sensor 108' for sensing device mechanical configuration. Device mechanical configuration may relate to the orientation of different portions of device 100 with respect to each other. For example, device mechanical configuration for device 100 may relate to the orientation of display 102 portion with respect to base portion 104. To sense this type of condition, at least one sensor 108' may be, for example, an electromechanical sensor configured to sense a position (e.g., angle) of the hinge between display portion 102 and base portion 104 or to sense contact between device portions 102 and 104 (e.g., when in the closed configuration), a hall-effect sensor configured to determine when device 100 is in open configuration 400 or closed configuration 402 based on magnetic field sensing, light/dark sensors to determine when device portions 102 and 104 have come into contact, etc.

The mechanical configuration sensed for device 100 may be used by controller 300 in controlling multiplexer 302 to select at least one antenna 106' for coupling to communication module 212. For example, if device 100 is sensed to be in open configuration 400 then a certain antenna (e.g., antenna 106B) may be selected based on the assumption that, for example, device 100 will be used for typing and may remain somewhat stationary (e.g., on a table top), and in that configuration a top-mounted antenna will provide good reception. Moving display portion 102 towards base portion 104, wherein the display of device 100 is enclosed within the clamshell, results in closed configuration 402. In closed configuration 402, controller 300 may determine to disable antennas 106' if device 100 goes to sleep or enters a similar mode with no active wireless communication, or may select at least one antenna 106' (e.g. antenna 106C) presumed to be in a good location to maintain wireless connectivity while device 100 is in closed configuration 402 (e.g., antenna 106C will presumably not be blocked a user's body if device 100 is being carried).

However, other mechanical orientations may also be possible in some devices to activate alternative operation modes. For example, it may be possible to rotate display portion 102 in the direction opposite to closed configuration 402 as shown in tablet configuration A 404. In such an instance, at least one sensor 108' may sense that display portion 102 has been moved to an orientation indicating that tablet functionality should activate, and may indicate this mechanical configuration to controller 300. In tablet configuration A 404, the hinge coupling portions 102 and 104 may be the highest point of device 100 with respect to the surface on which device 100 is resting, and thus, controller 300 may determine to select at least one antenna (e.g., antenna 106D) based on the antenna closest to the hinge being in the best position to conduct wireless communication. Tablet configuration B 406 illustrates another possible configuration wherein display portion can be rotated at least 180 degrees on the vertical axis as well as moving axially based on the hinge connecting device portions 102 and 104. The additional axis of rotation may allow display portion 102 to be rotated 180 degrees (indicated by "1" in FIG. 4), before being moved into the closed position (indicated by "2" in FIG. 4). The resulting configuration allows device 100 to be configured as a tablet computing device that may be easily held, moved, etc. Presuming that in tablet configuration B 406 device 100 will typically be held by the sides, the bottom may rest against the body of a user, etc., controller 300 may select at least one antenna (e.g., antenna 106 D) that will have the best likelihood of not be blocked by the user's body.

In one embodiment, controller 300 may receive device condition information from more than one sensor 108' in device 100, and using the multiple inputs may select at least one antenna 106' to be coupled to communication module 212. The use of multiple inputs may replace some of the reliance on presumptions regarding the best antenna to select based on the expected usage for device 100. For example, a sensed mechanical orientation may indicate to controller 300 that device condition information from other sensors 108' in device 100 should be considered when determining the at least one antenna 106' to be coupled to communication module 212. In one embodiment, in sensing that device 100 is in open configuration 400 or tablet configuration A 404 it may be presumed that device 100 will remain substantially stationary (e.g., on a table top), and thus, the need to consider other device conditions may be unnecessary. On the other hand, sensing that device 100 is in closed configuration 402 or tablet configuration B 406 may suggest that device 100 is likely to be held, moved, etc., and thus, that device condition information from other sensors 108' in device 100 may be considered, in addition to sensed mechanical orientation information, to select an antenna able to provide good quality of service for wireless interactions.

Figure 5:
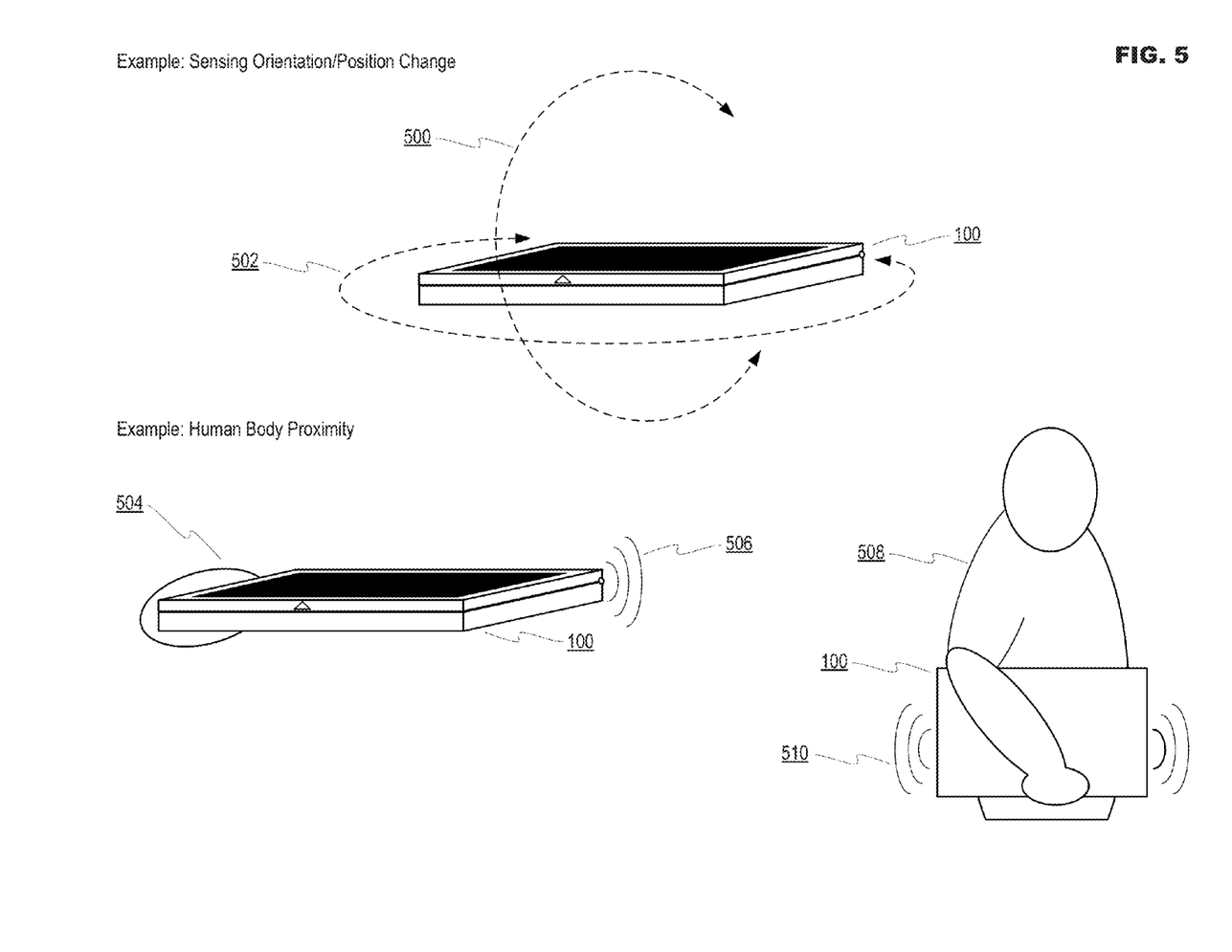
FIG. 5 illustrates examples of sensing device orientation or position change and human body proximity in accordance with at least one embodiment of the present disclosure.

FIG. 5 illustrates examples of sensing device orientation or position change and human body proximity in accordance with at least one embodiment of the present disclosure. Device orientation and position change, as well as human body proximity, are two examples of device conditions that may be used by controller 300 in selecting at least one antenna 106' to be coupled to communication module 212. These device conditions may be utilized as the primary input to controller 300, or may be used as secondary information such as immediately described above. The determination of device orientation and/or position change may employ sensors 108' that provide information regarding device orientation on an absolute basis (e.g., magnetic compass headings) or relative to a fixed point such as, for example, a wireless access point (AP) or other nearby reference point. Orientation may also be established using gravity-based sensors similar to those used to automatically change screen orientation in mobile devices when rotated (e.g., a tilt sensor, gyroscope, etc.). Device position change may be determined using various sensors configured to measure the movement or acceleration of device 100 (e.g., accelerometer, etc.). For example, given device 100 is a tablet computing device, or is at least in tablet configuration B 406 based on sensed mechanical orientation, rotating device 100 as shown at 502 and/or 504 (e.g., from a landscape to a portrait orientation) may cause user interface module 208 to reorient how information is being displayed. This orientation change may also dictate how the device is being held by the user. Controller 300 may then determine to activate a different antenna 106' to avoid having an active antenna be near areas in device 100 that would typically be held by the user. Moreover, sensing that device 100 has moved or is accelerating rapidly may indicate that the user of device 100 is moving (e.g., walking, in a car, on public transportation, etc.), which may cause controller 300 to select at least one antenna most appropriate for such situations.

Proximity detection that employs technology such as capacitive sensing (e.g., capacitive sensors) may help determine when device 100 is close to a human body. Being aware of human body proximity may be important to manage the amount of SAR exposure for a user of device 100. To limit exposure, proximity sensors 108' may be situated close to each of the antennas 106' in device 100 (e.g., referring to FIG. 1, sensors 108A-D are positioned close to each of antennas 106A-D). As shown in FIG. 5, a determination may be made that hand 504 is close to an antenna 106' in device 100 (e.g., when a user holds device 100 in his/her left hand). This information may cause controller 300 to select an antenna on the right side of device 100 (e.g., antenna 106C) to be coupled to communication module 212 as shown at 506. The selection of antenna 106C may minimize RF signal exposure for the user while possibly improving wireless communication performance in device 100 by removing the user's body from being a potential source of interference. In another usage example, user 508 may be carrying device 100 in closed configuration 402. Given that communications are still active in device 100, proximity sensing may sense the user's body proximate to top and bottom antennas in device 100 (e.g., to antennas 106B and D) and may select at least one of antennas 106A and C as shown at 510. Again, the selection of antennas 106A and/or C may protect the user from RF exposure while potentially increasing quality of service. Orientation/position change sensing, as well as proximity sensing, may also be employed on an as-needed basis in device 100 (e.g., as secondary device condition information) based on a primary sensed device condition (e.g., sensed mechanical configuration) to conserve processing and/or power resources, which may be more scarce in portable devices.

Figure 6:
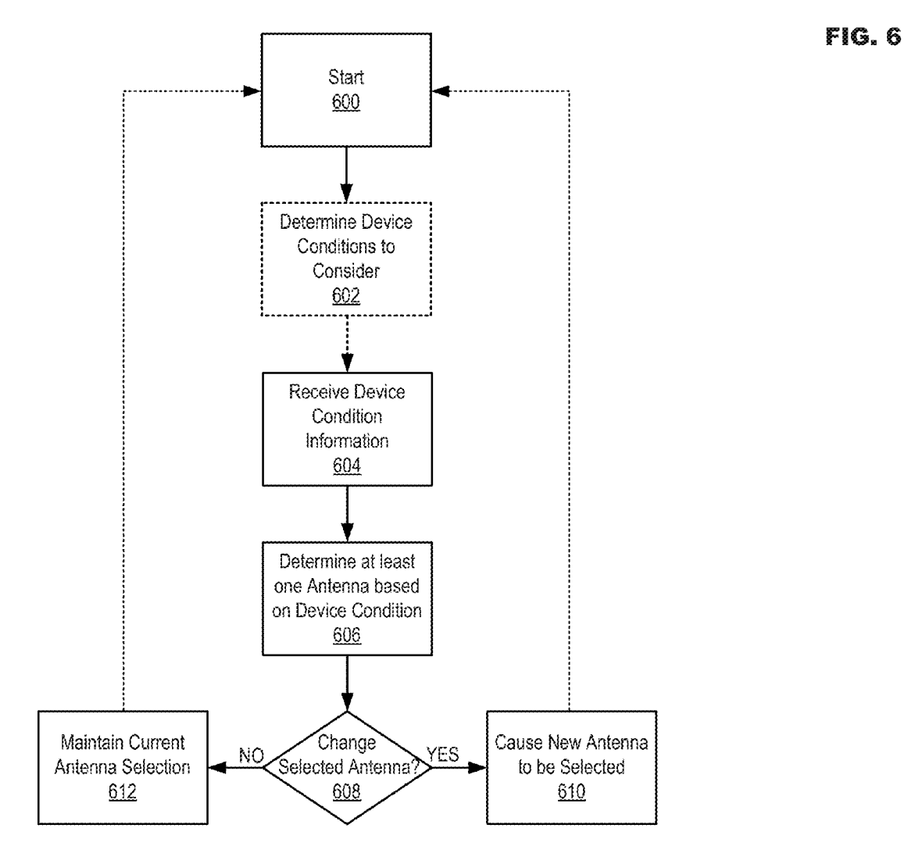
FIG. 6 illustrates example operations for adaptive antenna selection in accordance with at least one embodiment of the present disclosure.

FIG. 6 illustrates example operations for adaptive antenna selection in accordance with at least one embodiment of the present disclosure. Following startup in operation 600 an optional operation 602 may be performed to determine the device conditions to consider in a device. This step may be optional if, for example, there is only one device condition sensed in the device or if all conditions are always under consideration in a device. Once the device conditions to consider have been established, in operation 604 device conditions may be received (e.g., into an antenna selection module in the device). The antenna selection module may be configured to determine at least one antenna for selection based on the device condition information in operation 606. For example, the antenna selection module may consider the device condition information and may determine at least one antenna that will provide the best performance based on the device condition information, may determine an antenna that will not be proximate to the body of the device user or a source of interference, etc. A determination may then be made in operation 608 as to whether the currently selected antenna needs to be changed in view of the determination made in operation 606. If it is determined in operation 608 that the selected antenna needs to be changed, then the antenna selection module may cause at least one new antenna to be selected (e.g., to be coupled to a communication module in the device) in operation 610. If in operation 608 it is determined that the currently selected antenna does not need to be changed, then the currently selected antenna may be maintained in operation 612. Optionally, operations 610 or 612 may be followed by operation 600 wherein device condition monitoring may reinitiate.

While FIG. 6 illustrates various operations according to an embodiment, it is to be understood that not all of the operations depicted in FIG. 6 are necessary for other embodiments. Indeed, it is fully contemplated herein that in other embodiments of the present disclosure, the operations depicted in FIG. 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, the present disclosure is directed to adaptive antenna selection. In general, devices consistent with the present disclosure may be configured to adapt their antenna configuration to sensed device conditions. In one embodiment, an example device may comprise a communication module, a plurality of antennas, at least one sensor and an antenna selection module. The communication module may be configured to send and receive information via at least wireless communication. The plurality of antennas may be configured to conduct the wireless communication, while the sensors may be configured to sense device conditions. The antenna selection module may be configured to cause at least one antenna in the plurality of antennas to be coupled to the communication module based on the device conditions.

The following examples pertain to further embodiments. In one example embodiment there is provided a device. The device may include a communication module configured to send and receive information via at least wireless communication, a plurality of antennas configured to conduct the wireless communication, at least one sensor configured to sense device conditions, and an antenna selection module configured to cause at least one antenna in the plurality of antennas to be coupled to the communication module based on the device conditions.

The above example device may be further configured, wherein the antenna selection module comprises at least a multiplexer coupled to the communication module and the plurality of antennas, the multiplexer being configured to select the at least one antenna to be coupled to the communication module. In this configuration the example device may be further configured, wherein the antenna section module further comprises a controller coupled to the at least one sensor and the multiplexer, the controller being configured to control the selection of the multiplexer based on the sensed conditions.

The above example device may be further configured, alone or in combination with the above further configurations, wherein the device conditions includes a mechanical configuration of the device including at least an orientation of a first portion of the device relative to a second portion of the device, the antenna selection module being configured to cause the at least one antenna to be coupled to the communication module based on the mechanical configuration. In this configuration the example device may be further configured, wherein the device comprises at least a base portion and a display portion coupled by a movable connection configurable in at least one of an open orientation, a closed orientation or a tablet orientation, the antenna selection module being configured to cause the least one antenna to be coupled to the communication module based on whether the device is sensed to be in the open orientation, the closed orientation or the tablet orientation.

The above example device may be further configured, alone or in combination with the above further configurations, wherein the device conditions includes at least one of an orientation or position change of the device, the antenna selection module being configured to cause the at least one antenna to be coupled to the communication module based on at least one of the orientation or position change. In this configuration the example device may be further configured, wherein the device is configurable as a tablet computing device and the antenna selection module is configured to cause the at least one antenna to be coupled to the communication module based on the device being sensed as operating in a landscape or portrait orientation.

The above example device may be further configured, alone or in combination with the above further configurations, wherein the device conditions includes proximity of the plurality of antennas to a human body, the antenna selection module being configured to cause the at least one antenna to be coupled to the communication module based on the at least one antenna being sensed as not proximate to the human body.

In another example embodiment there is provided a method. The method may include receiving device condition information from at least one sensor in the device, determining at least one antenna from a plurality of antennas in the device based on the device condition information, and causing the at least one antenna to be coupled to a communication module in the device.

The above example method may be further configured, wherein the device condition information indicates a mechanical configuration of the device including at least an orientation of a first portion of the device relative to a second portion of the device.

The above example method may be further configured, alone or in combination with the above further configurations, wherein the device condition information indicates at least one of an orientation or position change for the device.

The above example method may be further configured, alone or in combination with the above further configurations, wherein the device condition information indicates proximity of the plurality of antennas to a human body.

The above example method may be further configured, alone or in combination with the above further configurations, wherein causing the at least one antenna to be coupled to the communication module comprises controlling a multiplexer in the device coupled to the communication module and the plurality of antennas to select the at least one antenna to be coupled to the communication module based on the device condition information.

The above example method may be further comprise, alone or in combination with the above further configurations, determining from which sensors in the device to receive device condition information prior to receiving the device condition information.

In another example embodiment there is provided a system comprising a device including at least one sensor, a plurality of antennas and a communication module, the system being arranged to perform any of the above example methods.

In another example embodiment there is provided a chipset arranged to perform any of the above example methods.

In another example embodiment there is provided at least one machine readable medium comprising a plurality of instructions that, in response to be being executed on a computing device, cause the computing device to carry out the method according to any of the above example methods.

In another example embodiment there is provided a device configured for adaptive antenna selection arranged to perform any of the above example methods.

In another example embodiment there is provided a device having means to perform any of the above example methods.

In another example embodiment there is provided at least one machine-readable storage medium having stored thereon individually or in combination, instructions that when executed by one or more processors result in the system carrying out any of the above example methods.

In another example embodiment there is provided a device. The device may include a communication module configured to send and receive information via at least wireless communication, a plurality of antennas configured to conduct the wireless communication, at least one sensor configured to sense device conditions, and an antenna selection module configured to cause at least one antenna in the plurality of antennas to be coupled to the communication module based on the device conditions.

The above example device may be further configured, wherein the antenna selection module comprises at least a multiplexer coupled to the communication module and the plurality of antennas, the multiplexer being configured to select the at least one antenna to be coupled to the communication module. In this configuration the example device may be further configured, wherein the antenna section module further comprises a controller coupled to the at least one sensor and the multiplexer, the controller being configured to control the selection of the multiplexer based on the sensed conditions.

The above example device may be further configured, alone or in combination with the above further configurations, wherein the device conditions includes a mechanical configuration of the device including at least an orientation of a first portion of the device relative to a second portion of the device, the antenna selection module being configured to cause the at least one antenna to be coupled to the communication module based on the mechanical configuration.

The above example device may be further configured, alone or in combination with the above further configurations, wherein the device conditions includes at least one of an orientation or position change of the device, the antenna selection module being configured to cause the at least one antenna to be coupled to the communication module based on at least one of the orientation or position change.

The above example device may be further configured, alone or in combination with the above further configurations, wherein the device conditions includes proximity of the plurality of antennas to a human body, the antenna selection module being configured to cause the at least one antenna to be coupled to the communication module based on the at least one antenna being sensed as not proximate to the human body.

In another example embodiment there is provided a method. The method may include receiving device condition information from at least one sensor in the device, determining at least one antenna from a plurality of antennas in the device based on the device condition information, and causing the at least one antenna to be coupled to a communication module in the device.

The above example method may be further configured, wherein the device condition information indicates a mechanical configuration of the device including at least an orientation of a first portion of the device relative to a second portion of the device.

The above example method may be further configured, alone or in combination with the above further configurations, wherein the device condition information indicates at least one of an orientation or position change for the device.

The above example method may be further configured, alone or in combination with the above further configurations, wherein the device condition information indicates proximity of the plurality of antennas to a human body.

The above example method may be further configured, alone or in combination with the above further configurations, wherein causing the at least one antenna to be coupled to the communication module comprises controlling a multiplexer in the device coupled to the communication module and the plurality of antennas to select the at least one antenna to be coupled to the communication module based on the device condition information.

In another example embodiment there is provided a system comprising a device including at least one sensor, a plurality of antennas and a communication module, the system being arranged to perform any of the above example methods.

In another example embodiment there is provided a chipset arranged to perform the method of any of the above example methods.

In another example embodiment there is provided at least one machine readable medium comprising a plurality of instructions that, in response to be being executed on a computing device, cause the computing device to carry out any of the above example methods.

In another example embodiment there is provided a device having means to perform any of the above example methods.

In another example embodiment there is provided a device. The device may include a communication module configured to send and receive information via at least wireless communication, a plurality of antennas configured to conduct the wireless communication, at least one sensor configured to sense device conditions, and an antenna selection module configured to cause at least one antenna in the plurality of antennas to be coupled to the communication module based on the device conditions.

The above example device may be further configured, wherein the antenna selection module comprises at least a multiplexer coupled to the communication module and the plurality of antennas, the multiplexer being configured to select the at least one antenna to be coupled to the communication module. In this configuration the example device may be further configured, wherein the antenna section module further comprises a controller coupled to the at least one sensor and the multiplexer, the controller being configured to control the selection of the multiplexer based on the sensed conditions.

The above example device may be further configured, alone or in combination with the above further configurations, wherein the device conditions includes a mechanical configuration of the device including at least an orientation of a first portion of the device relative to a second portion of the device, the antenna selection module being configured to cause the at least one antenna to be coupled to the communication module based on the mechanical configuration. In this configuration the example device may be further configured, wherein the device comprises at least a base portion and a display portion coupled by a movable connection configurable in at least one of an open orientation, a closed orientation or a tablet orientation, the antenna selection module being configured to cause the least one antenna to be coupled to the communication module based on whether the device is sensed to be in the open orientation, the closed orientation or the tablet orientation.

The above example device may be further configured, alone or in combination with the above further configurations, wherein the device conditions includes at least one of an orientation or position change of the device, the antenna selection module being configured to cause the at least one antenna to be coupled to the communication module based on at least one of the orientation or position change. In this configuration the example device may be further configured, wherein the device is configurable as a tablet computing device and the antenna selection module is configured to cause the at least one antenna to be coupled to the communication module based on the device being sensed as operating in a landscape or portrait orientation.

The above example device may be further configured, alone or in combination with the above further configurations, wherein the device conditions includes proximity of the plurality of antennas to a human body, the antenna selection module being configured to cause the at least one antenna to be coupled to the communication module based on the at least one antenna being sensed as not proximate to the human body.

In another example embodiment there is provided a method. The method may include receiving device condition information from at least one sensor in the device, determining at least one antenna from a plurality of antennas in the device based on the device condition information, and causing the at least one antenna to be coupled to a communication module in the device.

The above example method may be further configured, wherein the device condition information indicates a mechanical configuration of the device including at least an orientation of a first portion of the device relative to a second portion of the device.

The above example method may be further configured, alone or in combination with the above further configurations, wherein the device condition information indicates at least one of an orientation or position change for the device.

The above example method may be further configured, alone or in combination with the above further configurations, wherein the device condition information indicates proximity of the plurality of antennas to a human body.

The above example method may be further configured, alone or in combination with the above further configurations, wherein causing the at least one antenna to be coupled to the communication module comprises controlling a multiplexer in the device coupled to the communication module and the plurality of antennas to select the at least one antenna to be coupled to the communication module based on the device condition information.

The above example method may be further comprise, alone or in combination with the above further configurations, determining from which sensors in the device to receive device condition information prior to receiving the device condition information.

In another example embodiment there is provided a system. The system may include means for receiving device condition information from at least one sensor in a device, means for determining at least one antenna from a plurality of antennas in the device based on the device condition information, and means for causing the at least one antenna to be coupled to a communication module in the device.

The above example system may be further configured, wherein the device condition information indicates a mechanical configuration of the device including at least an orientation of a first portion of the device relative to a second portion of the device.

The above example system may be further configured, alone or in combination with the above further configurations, wherein the device condition information indicates at least one of an orientation or position change for the device.

The above example system may be further configured, alone or in combination with the above further configurations, wherein the device condition information indicates proximity of the device to a human body.

The above example system may be further configured, alone or in combination with the above further configurations, wherein causing the at least one antenna to be coupled to the communication module comprises controlling a multiplexer in the device coupled to the communication module and the plurality of antennas to select the at least one antenna to be coupled to the communication module based on the device condition information.

The above example system may further comprise, alone or in combination with the above further configurations, means for determining from which sensors in the device to receive device condition information prior to receiving the device condition information.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device, comprising:
   a housing;
   a communication module configured to send and receive information via at least wireless communication;
   a plurality of antennas configured to conduct the wireless communication;
   a plurality of sensors configured to sense device conditions; and
   an antenna selection module configured to cause at least one antenna in the plurality of antennas to be coupled to the communication module based on the device conditions; wherein:
   the antenna selection module comprises at least a multiplexer coupled to the communication module and the plurality of antennas, the multiplexer being configured to select the at least one antenna to be coupled to the communication module;
   the antenna selection module further comprises a controller coupled to the at least one sensor and the multiplexer;
   the plurality of sensors comprises:
   an orientation sensor to sense an orientation of the device and provide orientation information to said controller;

a proximity sensor to sense a proximity of at least a portion of a human body and provide proximity information to said controller;

a configuration sensor to sense a mechanical configuration of the housing and provide mechanical configuration information to said controller; and a motion sensor configured to sense motion of the device and provide motion information to said controller;

said controller is configured to control which of the plurality of antennas is selected by the multiplexer based at least in part on a combination of at least one of said proximity information and motion information, and at least one of said orientation information and said mechanical configuration information.

2. The device of claim 1, wherein:

said housing comprises a first portion and a second portion moveably coupled to one another by a moveable connection such that the first and second portions may be moveable relative to one another between an open configuration, a closed configuration, and a tablet configuration;

said mechanical configuration information correlates to one of the open configuration, the closed configuration, and the tablet configuration; and said controller is configured to control which of the plurality of antennas is selected by the multiplexer based at least in part on a combination of at least one of said proximity information and motion information, and said mechanical configuration information.

3. The device of claim 2, wherein first portion is a base portion and the second portion is a display portion.

4. The device of claim 2, wherein the device is in the tablet configuration, the controller is configured to control which of the plurality of antennas is selected by the multiplexer based at least in part on a combination of at least one of said proximity information and motion information, and both of said orientation information and said mechanical configuration information.

5. The device of claim 1, wherein the controller is configured to control which of the plurality of antennas is selected by the multiplexer based at least in part on a combination of at least one of said proximity information and motion information, and said orientation information.

6. A method, comprising:

receiving device condition information from at least one sensor in the device;

determining at least one selected antenna from a plurality of antennas in the device based on the device condition information, the device condition information comprising a combination of:

at least one of proximity information and motion information, the proximity information indicative of a proximity of at least a portion of a human body to a device, the motion information indicative of motion of the device; and at least one of mechanical configuration information and orientation information, the mechanical configuration information indicative of a configuration of a housing of the device, the orientation information indicative of an orientation of the device; and causing the at least one selected antenna to be coupled to a communication module in the device.

7. The method of claim 6, wherein:

the housing comprises a first portion and a second portion that are moveably coupled to one another such that they are moveable between an open configuration, a closed configuration, and a tablet configuration;

the mechanical configuration information is indicative of at least one of the open configuration, closed configuration, and tablet configuration; and said device condition information comprises at least a combination of at least one of said proximity information and motion information, and said mechanical configuration information.

8. The method of claim 6, wherein the device condition information comprises a combination of at least one of said proximity information and motion information, and said orientation information.

9. The method of claim 6, wherein the proximity information is indicative of the proximity of the plurality of antennas to a human body.

10. The method of claim 6, wherein causing the at least one selected antenna to be coupled to the communication module comprises controlling a multiplexer in the device coupled to the communication module and the plurality of antennas to select the at least one selected antenna.

11. The method of claim 6, wherein:

the device further comprises a plurality of sensors to provide at least a portion of said device condition information; and the method further comprises determining, prior to receiving the device condition information, from which of said plurality of sensors the device condition information is to be received.

12. At least one non-transitory machine-readable storage medium having stored thereon, individually or in combination, instructions that when executed by one or more processors result in the following operations comprising:

receiving device condition information from at least one sensor in a device;

determining at least one selected antenna from a plurality of antennas in the device based on the device condition information, the device condition information comprising a combination of:

at least one of proximity information and motion information, the proximity information indicative of a proximity of at least a portion of a human body to a device, the motion information indicative of motion of the device; and at least one of mechanical configuration information and orientation information, the mechanical configuration information indicative of a configuration of a housing of the device, the orientation information indicative of an orientation of the device; and causing the at least one selected antenna to be coupled to a communication module in the device.

13. The medium of claim 12, wherein:

the housing comprises a first portion and a second portion that are moveably coupled to one another such that they are moveable between an open configuration, a closed configuration, and a tablet configuration;

the mechanical configuration information is indicative of at least one of the open configuration, closed configuration, and tablet configuration; and said device condition information comprises at least a combination of at least one of said proximity information and motion information, and said mechanical configuration information.

14. The medium of claim 12, wherein the device condition information comprises a combination of at least one of said proximity information and motion information, and said orientation information.

15. The medium of claim 12, wherein the proximity information is indicative of the proximity of the plurality of antennas to a human body.

16. The medium of claim 12, wherein causing the at least one selected antenna to be coupled to the communication module comprises controlling a multiplexer in the device coupled to the communication module and the plurality of antennas to select the at least one selected antenna.

17. The medium of claim 12, further comprising instructions that when executed by one or more processors result in the following operations comprising:
   determining, prior to receiving the device condition information, from which of a plurality of sensors of the device the device condition information is to be received.

* * * * *